(12) United States Patent
Marche

(10) Patent No.: US 9,062,626 B2
(45) Date of Patent: Jun. 23, 2015

(54) THRUST REVERSER FOR AN AIRCRAFT HAVING SEMI-RECESSED TURBOFAN ENGINES

(75) Inventor: Jacques Herve Marche, Toulouse (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 437 days.

(21) Appl. No.: 13/520,917

(22) PCT Filed: Dec. 27, 2010

(86) PCT No.: PCT/FR2010/052918
§ 371 (c)(1),
(2), (4) Date: Aug. 29, 2012

(87) PCT Pub. No.: WO2011/083256
PCT Pub. Date: Jul. 14, 2011

(65) Prior Publication Data
US 2013/0097998 A1    Apr. 25, 2013

(30) Foreign Application Priority Data

Jan. 8, 2010    (FR) ...................................... 10 50093

(51) Int. Cl.
*F02K 1/70*    (2006.01)
*F02K 1/62*    (2006.01)

(52) U.S. Cl.
CPC ... *F02K 1/70* (2013.01); *F02K 1/62* (2013.01); *Y02T 50/672* (2013.01); *F05D 2240/12* (2013.01); *F05D 2260/90* (2013.01)

(58) Field of Classification Search
CPC .............. F02K 1/58; F02K 1/62; F02K 1/60; F02K 1/70; F02K 1/72; F02K 1/76
USPC .......................... 60/226.2, 226.3; 244/110 B; 239/265.23, 265.33
See application file for complete search history.

(56) References Cited

U.S. PATENT DOCUMENTS

| 3,658,279 A | 4/1972 | Robertson |
| 4,030,687 A | 6/1977 | Hapke |

(Continued)

FOREIGN PATENT DOCUMENTS

| EP | 0 601 910 | 6/1994 |
| EP | 0 774 578 | 5/1997 |

(Continued)

OTHER PUBLICATIONS

International Search Report Issued Mar. 10, 2011 in PCT/FR10/52918 Filed Dec. 27, 2010.

*Primary Examiner* — Phutthiwat Wongwian
*Assistant Examiner* — William Breazeal
(74) *Attorney, Agent, or Firm* — Oblon, McClelland, Maier & Neustadt, L.L.P.

(57) ABSTRACT

A propulsion unit comprising a turbofan engine faired by a nacelle, and held in suspension by at least one pylon, the turbofan engine including a fan; a duct, bounded by an internal surface of the duct and an inner surface of the nacelle, that channels air accelerated by the fan; and a thrust reverser including a first part and a second part, wherein the turbofan engine has a first circumferential sector and a second circumferential sector distinct from the first circumferential sector, wherein the first circumferential sector and the second circumferential sector span the entire turbofan engine, the first part is entirely within the first circumferential sector and includes doors that channel the air in the duct towards an exterior of the nacelle via openings, and the second part is entirely within the second circumferential sector and includes mobile elements that channel the air in the duct toward the doors.

9 Claims, 8 Drawing Sheets

(56) References Cited

U.S. PATENT DOCUMENTS

| | | | |
|---|---|---|---|
| 4,137,711 A * | 2/1979 | Montgomery | 60/226.2 |
| 5,396,762 A | 3/1995 | Standish | |
| 5,775,097 A | 7/1998 | Lardy et al. | |
| 5,974,783 A | 11/1999 | Gonidec et al. | |
| 2002/0007625 A1 | 1/2002 | Fournier et al. | |
| 2010/0115916 A1 | 5/2010 | D'Inca et al. | |

FOREIGN PATENT DOCUMENTS

| | | |
|---|---|---|
| EP | 0 851 111 | 7/1998 |
| EP | 1 176 302 | 1/2002 |
| FR | 2 914 956 | 10/2008 |

* cited by examiner

THRUST REVERSER FOR AN AIRCRAFT HAVING SEMI-RECESSED TURBOFAN ENGINES

The invention pertains to the field of propulsion systems for aircraft. It particularly concerns thrust reversers for jet propulsion with a secondary flow system.

BACKGROUND OF THE INVENTION AND DESCRIPTION OF THE PROBLEM

Thrust reversers are brake devices that have been in use for decades on turbojet powered airplanes during landings. Their function is, at least, to suppress residual thrust in jet engines towards the rear of the aircraft, even when these are slowed down during landing. Preferably, their function is to redirect a part of the flow of gas produced by the engine toward the front of the aircraft. This action brings about a deceleration of the airplane, facilitating the braking action.

The description that follows is limited to double-flow turbofan engines, such as those used as standard equipment for commercial aircraft. These turbofan engines comprise a ducted fan driven by the jet turbine, which generates what is known as a secondary airflow that circulates in an annular channel around the jet engine itself.

Nevertheless, flight reversers are devices used solely for assisting in the braking process, and not as the primary braking device. Furthermore, commercial aircraft certification is carried assuming that thrust reversers are not in use, as the braking system must be adequate to bring an airplane to a complete stop on its own. Nevertheless, airlines seek ways of improving safety and reducing operating costs for their fleets. Against this backdrop, thrust reversers are seen as a guarantee of safety, especially during landings in bad weather conditions, as well as during landings on wet airstrips or on locally iced runways.

In addition, from an economic perspective, the use of thrust reversers decreases the landing distance required for an airplane by an amount in the range of 25% to 50%, depending on whether the runway is dry or slippery, resulting in less wear on tires and brakes during operations. In parallel, their use naturally brings about a reduction of time aircraft are using the runway, which results in savings in fuel and airport taxes for companies and allows airports to bring in more traffic. It is understood that thrust reversers must produce the strongest possible thrust toward the front of the aircraft and thus divert the greater part of the flow of gas from the jet engine.

At present, three principal types of thrust reversers are known.

The most standard and widely used system at the current time is the cascade type of thrust reversers. With this type of thrust reverser, only the secondary flow is channeled, i.e. the air flow that circulates in the faired duct encompassing the motor. To accomplish this, an interior blocker door is used to block the secondary flow, with air exhausted outside by means of an opening in the external surface of the motor. This opening is uncovered when operating interior doors by moving backwardly, in the direction of gas flow, a sliding hatch which is located outside the nacelle. The opening comprises a series of grilles, or cascades, arranged so as to monitor the angle of deflection of the flow. This type of reverser has been described in the patent document EP1176302.

The second type of thrust reverser is the blocker doors reverser. This type of reverser is made up of doors incorporated into the nacelle, four doors for example, arrayed angularly in a consistent manner. These doors are hinged on their rearward parts around axes perpendicular to the gas flows at a tangent to the surface of the nacelle and are operated by system controlled actuators. In reverse thrust mode, the four doors are opened, with the lower part of the doors thus blocking secondary flow, while the upper part of the doors serves to redirect reflected air. This blocker door type of a reverse thrust device has been described in the patent document EP0851111.

A third type of thrust reverser is known as the clamshell or target-type of thrust reverser. This is a thrust reverser disposed downstream of the nacelle that contains two clamshells. The salient characteristic of this thrust reverser is that in the thrust reverse mode, the device reverses not only the secondary flow, but the primary flow as well, because the two clamshells form an obstacle to the entire flow coming out of the jet engine and then redirect it forward by defining openings on the sides of the nacelle. This type of reverser has been described in the patent document EP0774578.

The installation of thrust reversers has naturally been planned for all new commercial aircraft in view of the economic and landing safety advantages the devices represent as described above.

Among these, certain airplane designs call for engine mounting configurations to the aft of the fuselage with the objective of reducing noise and drag, in which the propulsion system would be semi-recessed, in other words, the nacelle would be partially incorporated into the fuselage.

It is clear that the existing thrust reversers, of cascade type or blocker door type, are not liable to be installed on these kinds of aircraft.

OBJECTIVES OF THE INVENTION

The objective of this invention is to propose a new type of thrust reverser, adapted to be implemented by nacelles for which only a part of the surface is modified to house standard thrust reversers.

In particular, the objective of the invention is to propose a thrust reverser device for use in engines that are partially recessed into the fuselages of aircraft. Another objective of the invention is that it be mechanically less complex so as not to negatively affect the cost of a complete thrust reverser device.

Yet another objective of the invention is to utilize a part of existing thrust reverser devices, particularly those of the cascade or blocker door type.

EXPLANATION OF THE INVENTION

To this end, the invention places primary emphasis on a jet propulsion unit for an aircraft comprising an engine faired by a nacelle and suspended by at least one mount, with said jet propulsion unit comprising a thrust reverser device consisting of two parts:
  one part including a means for feeding back air towards the outside of the propulsive unit
  one part including means of channeling the secondary air flow circulating in a secondary duct between the engine and the nacelle, which can be removed and controlled, such as to offset the latter angularly in the secondary duct toward at least one means of flowing back the air to the exterior of the propulsive unit.

According to an advantageous embodiment, the means of flowing back the air toward the exterior of the propulsive unit are gathered in a first angular sector of the nacelle and the means for channeling the secondary air flow circulating between the propulsive unit and the nacelle are gathered in a second angular sector of the nacelle.

It is understood that the proposed solution consists of flowing back substantially the same flow of secondary air as that of a standard nacelle, while reserving a smaller angular sector for the thrust reverser itself.

Here the meaning of means of flowing back the air are to be understood as thrust reversers, of a standard type for example, of blocker doors type or of cascade type particularly.

Preferably, the means of channeling the secondary air flow circulating between the propulsive unit and the nacelle in the first angular sector comprise at least one internal deflector arranged to forming aerodynamic continuity with the external surface of the secondary air duct when this deflector is in the normal propulsion position, and to guide the secondary air flow toward external means of thrust reversal when this internal deflector is in the thrust reversal mode.

The principle of this thrust reverser is that in the thrust reverse mode, the so-called "reverse" mode, the secondary flow of air is directed outside by the reverse doors, but also by deflectors positioned inside the nacelle in the second angular sector.

The deflectors are designed in such a fashion that their exterior surfaces form an aerodynamic continuity with the internal shape of the nacelle, i.e. with the external surface of the secondary air duct. In this way, when the thrust reversal mode is disengaged, the deflectors do not deteriorate aerodynamic drag inside the jet pipe.

The same invention may be adapted to a concept of the blocker doors type or of the cascade thrust reverser type.

In this case, preferably at least one internal deflector comprises a first mobile surface rotatably hinged, with the shape of the first mobile surface determined by the fact that:

its surface is continuous with the external surface of the secondary air duct when the first mobile surface is in an angular inoperative position, and that two of its edges come into substantial contact with: the external surface of the secondary air duct and the internal surface of the secondary air duct, respectively, when the first mobile surface is in a thrust reversal angular position.

More particularly, at least one internal deflector includes a first mobile surface, located near a pylon traversing the secondary duct and supporting the propulsive unit in the nacelle, with an edge of this mobile surface coming into substantial contact with the surface of the pylon traversing a secondary air duct when the first mobile surface is in its thrust reversal angular position.

According to an advantageous implementation, the propulsive unit comprises two internal deflectors, arrayed on each side of a pylon supporting the propulsive unit.

It is nonetheless clear that the two deflectors can simply be arrayed symmetrically based on a symmetry plan comprising the longitudinal axis of the propulsive unit.

It is understood that, in this case, each deflector comprises an edge that, instead of coming into contact with the surface of a pylon, comes into contact with the corresponding edge of the symmetrical deflector.

According to a preferred embodiment; at least one internal deflector is formed by at least one of two mobile surfaces, substantially in the form of cylindrical or conical sectors, with each one rotatably hinged on an axis separate from the longitudinal axis of the propulsive unit, between an inoperative position in which the mobile surface is continuous with the external surface of the secondary air duct, and a thrust reversal position, in which the said mobile surfaces locally interrupt the secondary air flow, and channel it gradually toward some of the air backflow means.

In a particular embodiment, the abutting mobile surfaces comprise continuous edges facing each other, adapted so as to come into contact with each other when the said mobile surfaces are in a thrust reversal position.

According to a preferred embodiment, at least one mobile surface comprises an edge that comes into contact with the edge of a means of air backflow toward the exterior of the propulsive unit, when this mobile surface and this means of air backflow are in a position of thrust reversal.

According to a particular embodiment, at least one internal deflector is formed from a plurality of successive mobile surfaces, a first mobile surface being set in the area of a propulsive unit pylon and a last mobile surface set in the area of a means of air backflow toward the exterior of the propulsive unit, with the hinge axis of the first mobile surface oriented substantially at an angle of between 40 and 50° with the longitudinal axis of the propulsive unit, and the hinge axis of the last mobile surface oriented substantially at an angle of between 60 and 80° with the longitudinal axis of the propulsive unit.

We can see that this layout provides a substantially helical shape to the internal deflector made up of mobile surfaces, gradually channeling and guiding the air with an initially longitudinal speed toward a thrust reverser.

The invention also targets a propulsive unit as described, this propulsive unit being of a semi-recessed type, meaning that it comprises an engine faired by a nacelle, only an exterior angular segment of which juts outside of the fuselage, with the aircraft fuselage locally forming an engine fairing for the interior angular sector and the propulsive unit mechanically joined to the aircraft by the intermediary of a mount crossing the fuselage in the interior angular segment.

BRIEF DESCRIPTION OF DRAWINGS

The objectives and advantages of the invention will be better understood upon reading the description of the drawings of a particular embodiment, given as a non-limiting example and for which the drawings represent the following items.

DETAILED DESCRIPTION OF ONE EMBODIMENT OF THE INVENTION

Figure 1:
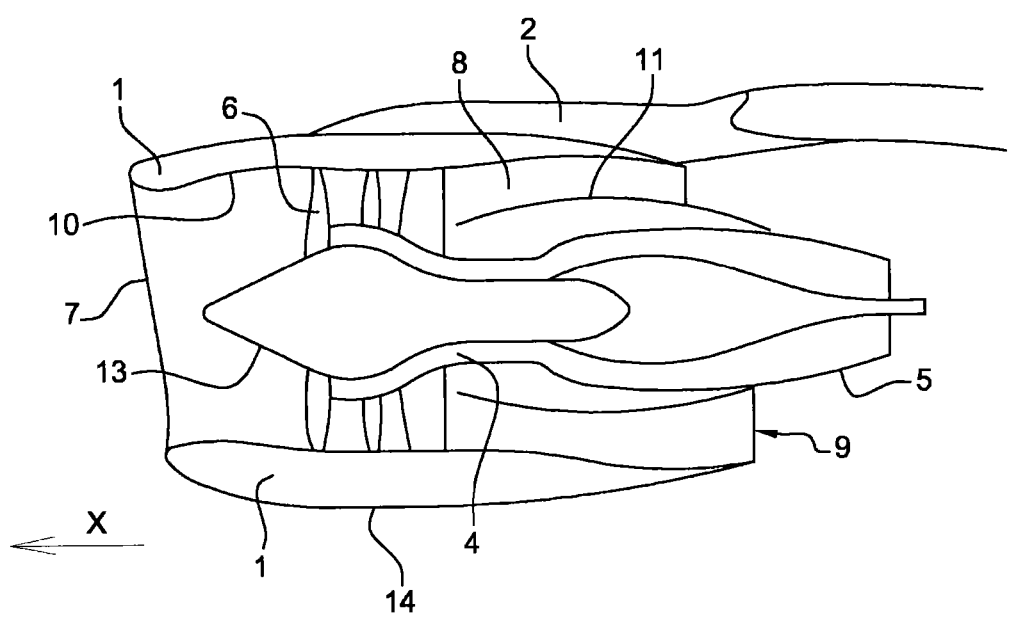
FIG. 1: A standard turbofan engine, in longitudinal section view

The invention can be implemented within a turbofan propulsive unit as illustrated in the section view in FIG. 1, here in an arrangement conforming to prior art.

A turbofan propulsive unit comprises a nacelle 1, mechanically tied into to the structure of an aircraft by a pylon 2 that extends to the interior of the nacelle 1 to carry a turbofan engine 3.

In a very simplified version, the turbofan engine 3 takes in air from the outside through an air intake 7 by means of a faired propeller/fan 6 with an intake cone 13. This propeller/fan 6 is driven in rotation with the other stages of a compressor by a turbine (not shown). The air injected by the turbofan engine 3 is separated into two parts: The first part is primary flow circulating in a primary duct 4, for which the air serves to burn fuel in a combustion chamber, and for which gases produced by combustion are strongly accelerated and exhausted toward the rear of the turbofan engine 3 by a tailpipe 5. The remainder of air flow, in fact the majority of the flow, that is taken in and accelerated by the propeller/fan 6, is channeled by a secondary duct 8 toward an exhaust area 9.

The interior surface of the nacelle 1 is, as may be understood, of a shape determined by the rotation of the propeller/fan 6, and therefore rotationally symmetric, except where the pylon 2 passes through, on a longitudinal axis X of the turbofan engine 3. This inner surface also forms the external surface 10 of the secondary duct 8.

The internal surface 11 of this secondary duct 8 is determined by the rear envelope of the turbofan engine 3. It is also primarily of a shape that is rotationally symmetric along the same longitudinal axis X.

The exterior surface of the nacelle 1 is called the outer cowl 14 of the propulsive unit for the rest of this description. Its shape is dictated by airplane design and aerodynamic considerations.

The various elements cited above, which form the turbofan engine 3 are considered well known per se by persons skilled in the art and are therefore not described more fully here.

Figure 2A:
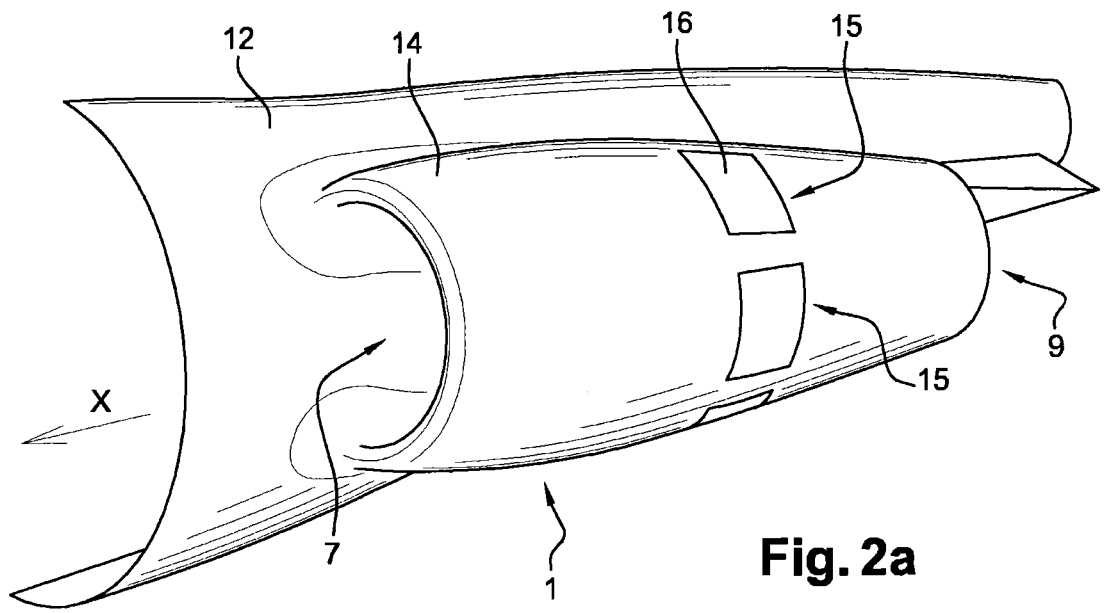
FIGS. 2a and 2b: A semi-recessed propulsive unit in perspective and front views
Figure 2B:
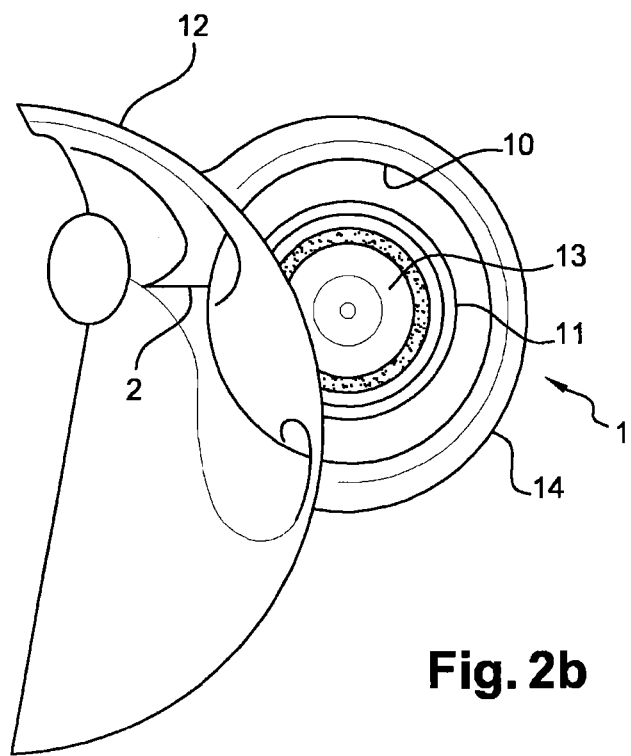

FIGS. 2a and 2b illustrate the case of an array of semi-recessed propulsive units, mentioned above, in which each nacelle 1 is partially integrated within the aft part of the fuselage 12 of an airplane. In the case here illustrated, an interior angular segment of around 120° of the nacelle 1 is incorporated within the fuselage, with an exterior angular segment of around 204° remaining "free" and presenting an exterior surface of a standard shape.

As can be seen in the drawings, the air intake 7 naturally no longer presents a rotationally symmetric aspect, but the rest of the secondary duct 8 overall maintains this symmetry. The pylon 2, which maintains the turbofan engine 3 in the center of the nacelle, is hidden within the structure and schematized simply in FIG. 2b.

Figure 3A:
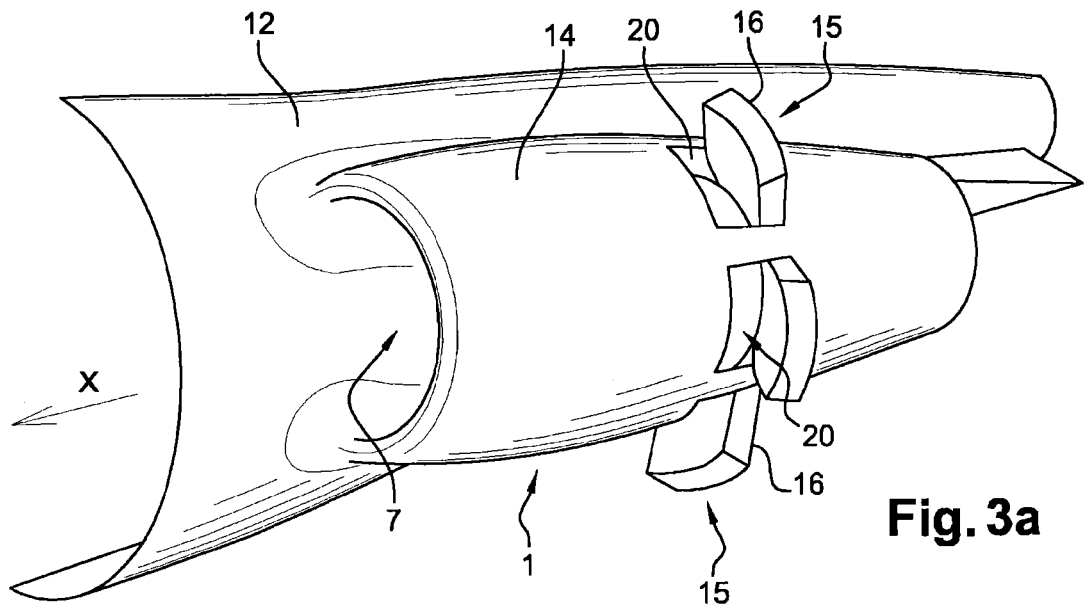
FIGS. 3a and 3b: Two views similar to FIGS. 2a and 2b of a semi-recessed propulsive unit, with thrust reversers in the active position
Figure 3B:
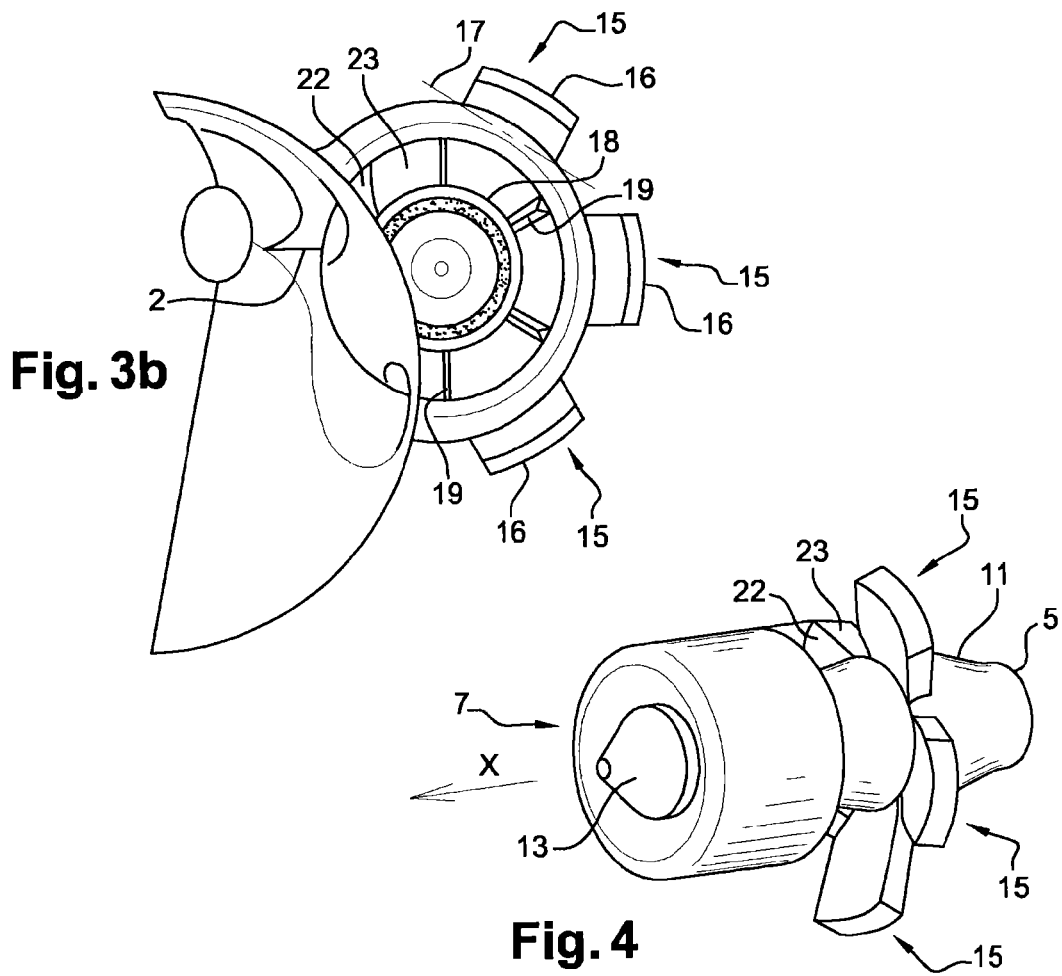

The thrust reverser device conforms to an embodiment of the invention comprising two parts, the first of which is clearly visible in FIG. 2a, as well as in FIGS. 3a and 3b.

This first part of the thrust reverser device comprises, in this fully non-limiting example, three pivoting doors 15, arrayed angularly in a consistent pattern on a sector covering 180° of the free part of the nacelle 1.

These pivoting doors 15 are arrayed to the right of the rear third of the turbofan engine 3.

They allow backflow of air toward the exterior of the propulsive unit; and are of a type known per se in the domain of door type thrust reverser prior art. Each pivoting door 15 is hinged in rotation on an axis 17 set out in a plane perpendicular to longitudinal direction X of the propulsive unit, and substantially tangent to the nacelle 1. To facilitate reading of FIG. 3b, one single axis of rotation 17 has been drawn.

As can be seen in FIGS. 2a and 3b, the pivoting doors 15 each present an exterior surface 16, forming aerodynamic continuity with the outer cowl 14 of the propulsive unit when these doors are in their inoperative position. Likewise, the pivoting doors 15 each present an interior surface 26, forming aerodynamic continuity with the external surface 10 of the secondary duct 8 of the propulsive unit when these doors are in their inoperative position. These pivoting doors 15 therefore substantially present a shape of a segment of a cylinder or a cone that locally takes on that of the nacelle 1 when they are in their inoperative positions.

Figure 4:
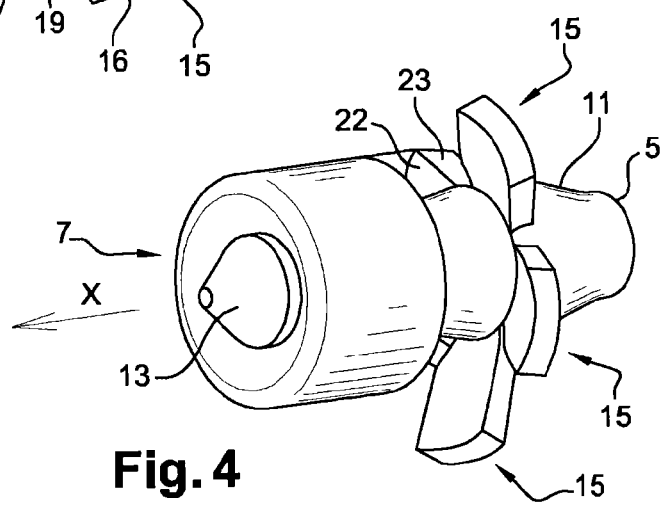
FIG. 4: A view of a turbofan engine and thrust reversers alone, seen from the same view angle as FIGS. 2a and 3a FIG. 5: A schematic view of a propulsive unit in a semi-recessed nacelle

In contrast, when these pivoting doors 15 are brought into a position of reverse thrust by the action of system operated cylinders (see FIG. 7b), they reveal openings 20 in the depth of the nacelle 1 that allow air to circulate in the secondary duct 8 to be exhausted outside and forward of the airplane. In this position, the rear edge 18 of the pivoting doors 15 meets up with the internal surface 11 of the secondary duct 8 (see also FIG. 4), thus forcing the airflow to pass through the openings 20 set into the substance of the nacelle 1. The pivoting doors 15 are, in this example, arrayed such that their rear edge 18 rests on the internal surface 11 of the secondary duct 8, substantially at the place with the diameter of this internal surface 11 is at its maximum.

As can be seen in FIG. 3b, the three pivoting doors 15 comprise a rear part formed into an angular segment such that in the thrust reversal position, the opposing lateral ridges 19 of the abutting pivoting doors 15 come into substantial contact with each other, which results in them preventing the passage of air in the secondary duct 8 between the said pivoting doors 15. In this manner, all of the secondary airflow circulating in an angular sector of 180° is deflected toward the openings 20.

The second part of the thrust reversal device conforming to the present embodiment of the invention comprises the mobile deflectors that channel air in the complementary sector of the secondary duct 8, so as to angularly displace it toward the area of the said secondary duct 8 that corresponds to the angular sector of the nacelle 1 into which the pivoting doors 15 are installed. Air that is channeled in this way can thus be directed using the pivoting doors 15 through the openings 20 in the substance of the nacelle 1.

Figure 5:
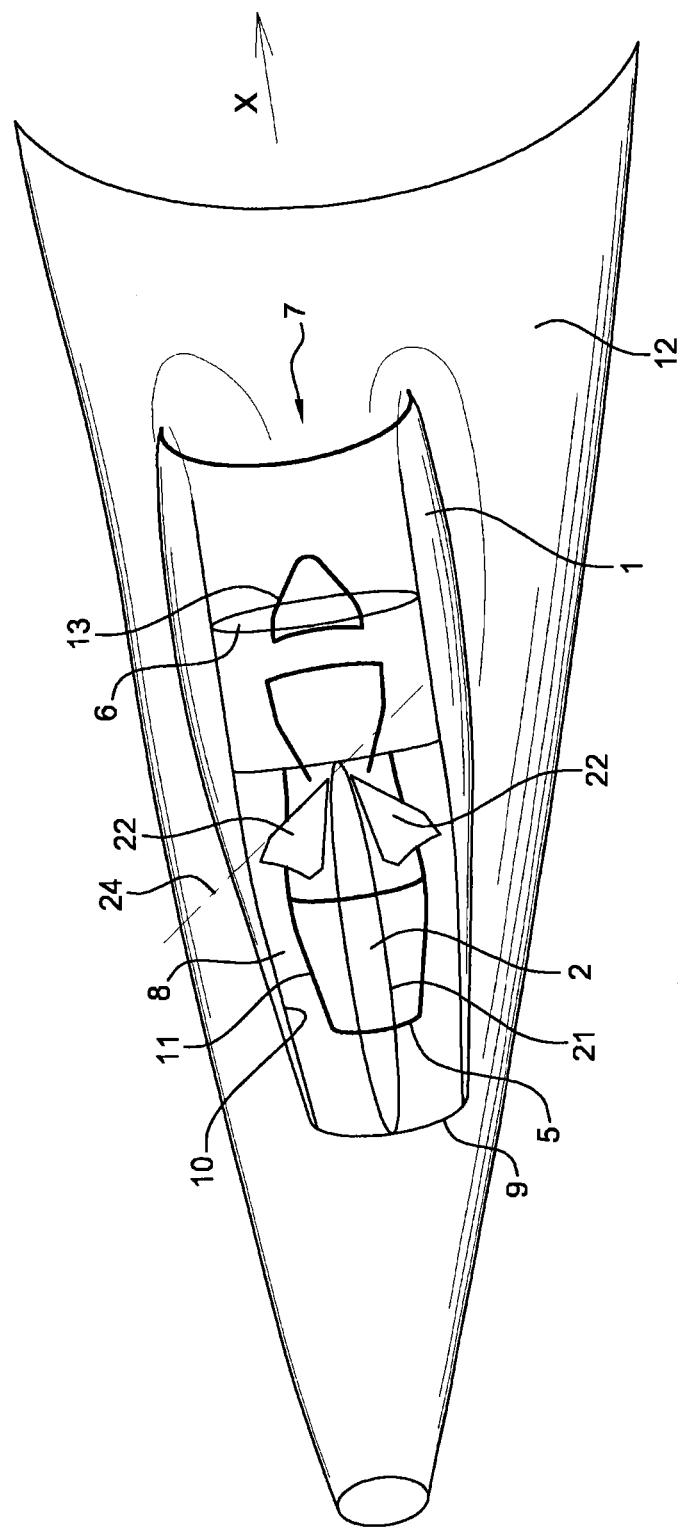
Figure 6:
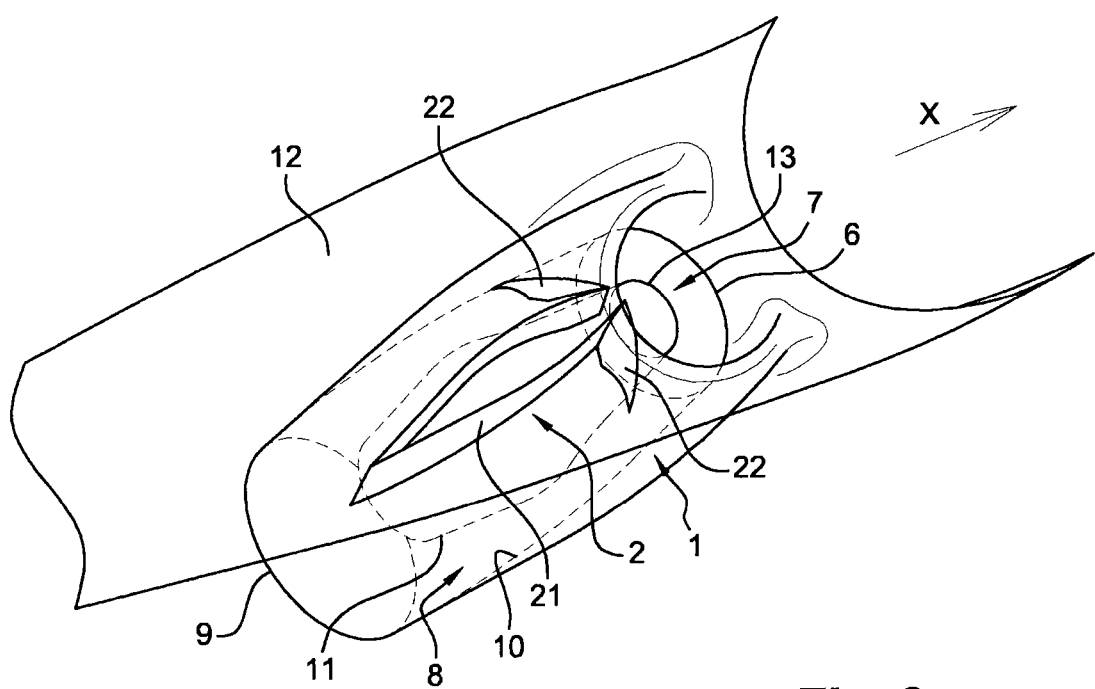
FIG. 6: A view of the semi-recessed propulsive unit, showing the mobile air channelization surfaces in the secondary duct

In this example, the turbofan 3 is suspended by a pylon 2 (see FIGS. 5 and 6, which illustrate the motor location from an internal view of the airplane) that traverses the secondary air duct 8, in the form of a surface 21 that is symmetric on a horizontal plane and essentially perpendicular to the external surfaces 10 and the internal surfaces 11 of the secondary duct 8. Two deflectors occupy space on either side of the pylon 2, inside the secondary duct 8. In this fully non-limiting example, these two deflectors have a symmetrical shape with relation to the pylon 2. In the thrust reversal position, each deflector forms a substantially continuous surface between the surface 21 of the pylon 2 and a lateral edge 19 of a pivoting door 15. In the same way, each deflector almost completely obstructs the secondary duct 8 in this position.

Figure 7A:
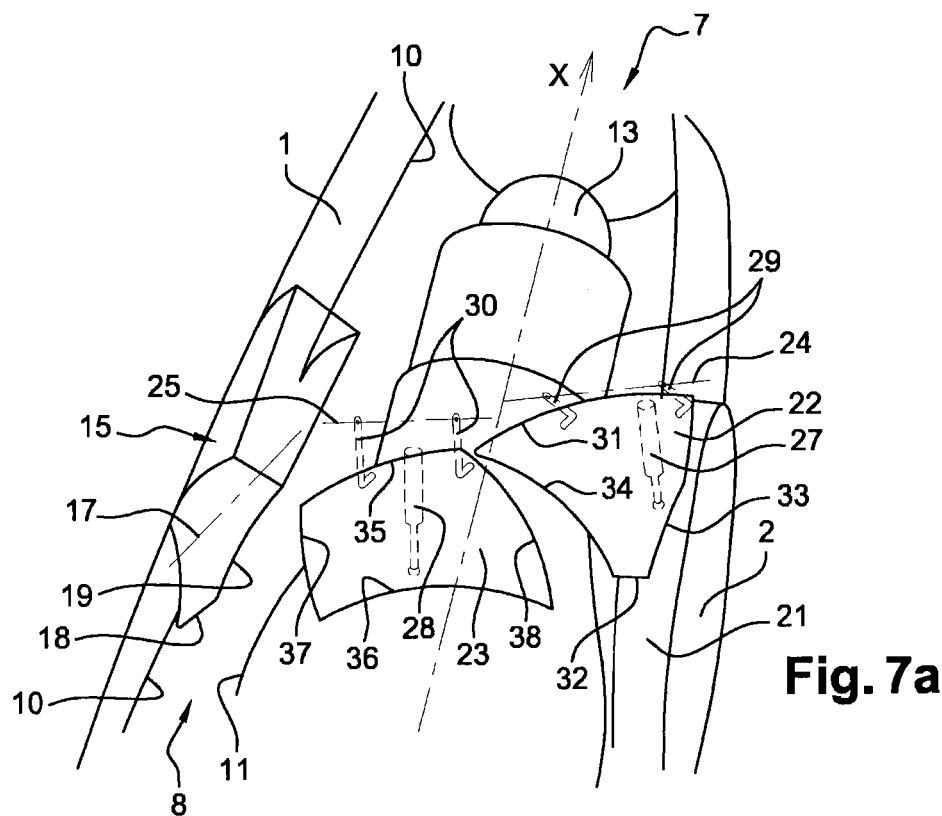
FIGS. 7a and 7b: Two cutaway views of the interior of a nacelle, illustrating the mobile surfaces for air channelization in the secondary duct and the thrust reversers themselves, with these various elements seen from their inoperative position and in their thrust reversal position
Figure 7B:
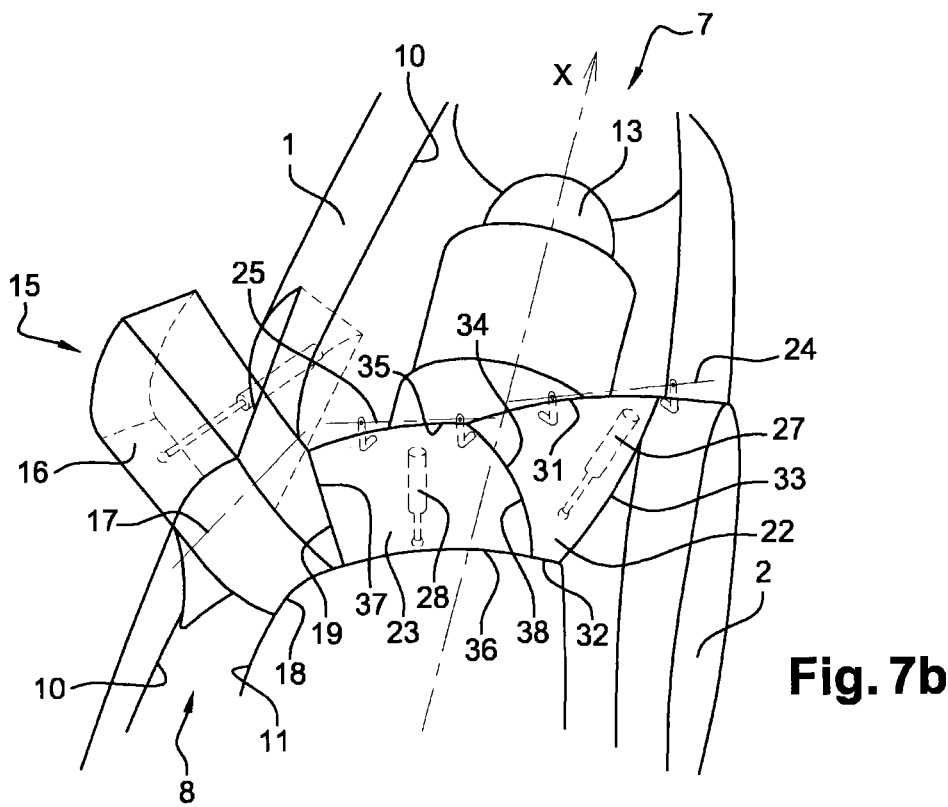

The deflector installed above the pylon 2 is detailed in FIGS. 7a and 7b. As can be seen in these drawings, in this embodiment the upper deflector, in its inoperative position, comprises two mobile surfaces 22, 23 that form a part of the external surface 10 of the secondary duct 8 of the propulsive unit. The first mobile surface 22 is located to the side of the pylon 2, and the second mobile surface 23 is located between the first mobile surface 22 and a pivoting door 15.

The first mobile surface 22 is hinged in rotation on an axis 24 that is practically tangent to the average local surface of the nacelle 1 and in this example, substantially directed at a 45° angle with relation to the longitudinal direction X of the propulsive unit. The second mobile surface 23 is hinged in rotation on an axis 25 that is also practically tangent to the average local surface of the nacelle 1 and in this example, substantially directed at a 65° angle with relation to the longitudinal direction X of the propulsive unit. These mobile surfaces 22, 23 are rotated by the action of cylinders 27, 28 of a type known per se. Each mobile surface 22, 23 is connected to its hinge axis 24, 25 by two L-shaped straps 29, 30 of a type known per se, such that when the mobile surfaces 22, 23 are rotated they are also displaced slightly toward the front of the secondary duct 8.

Remember that the pivoting door 15 is hinged in this example on an axis 17 directed at an angle of 90° with relation to the longitudinal direction of the propulsive unit. The disposition of the angles of the successive axes 24, 25, 17 of the mobile surfaces 22, 23 and of the pivoting door 15, which we have seen as being progressively more oriented perpendicular to the direction X of the propulsive unit's airflow, is intended to progressively deflect this flow of air and to transform its longitudinal speed into a lateral speed.

Figure 9A:
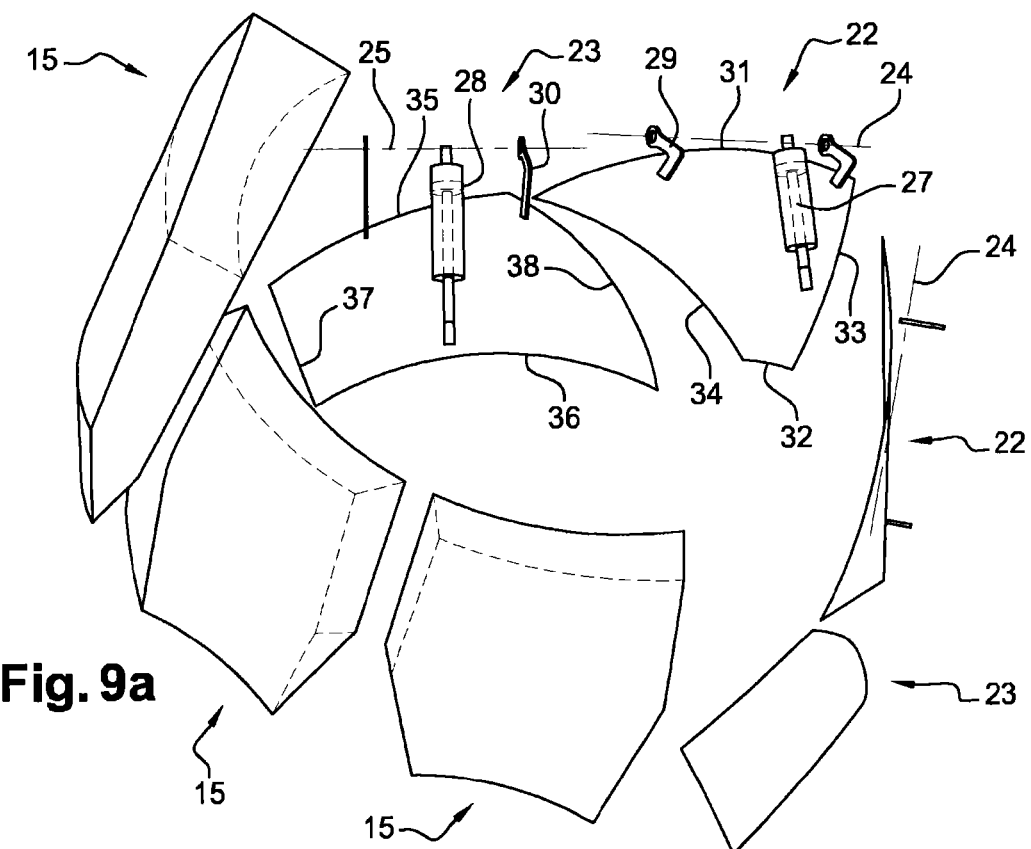
FIGS. 9a and 9b: Two views of mobile components of the thrust reversal device alone, with these elements seen from their inoperative position and in their thrust reversal position, in an aspect similar to that of FIGS. 7a and 7b.
Figure 9B:
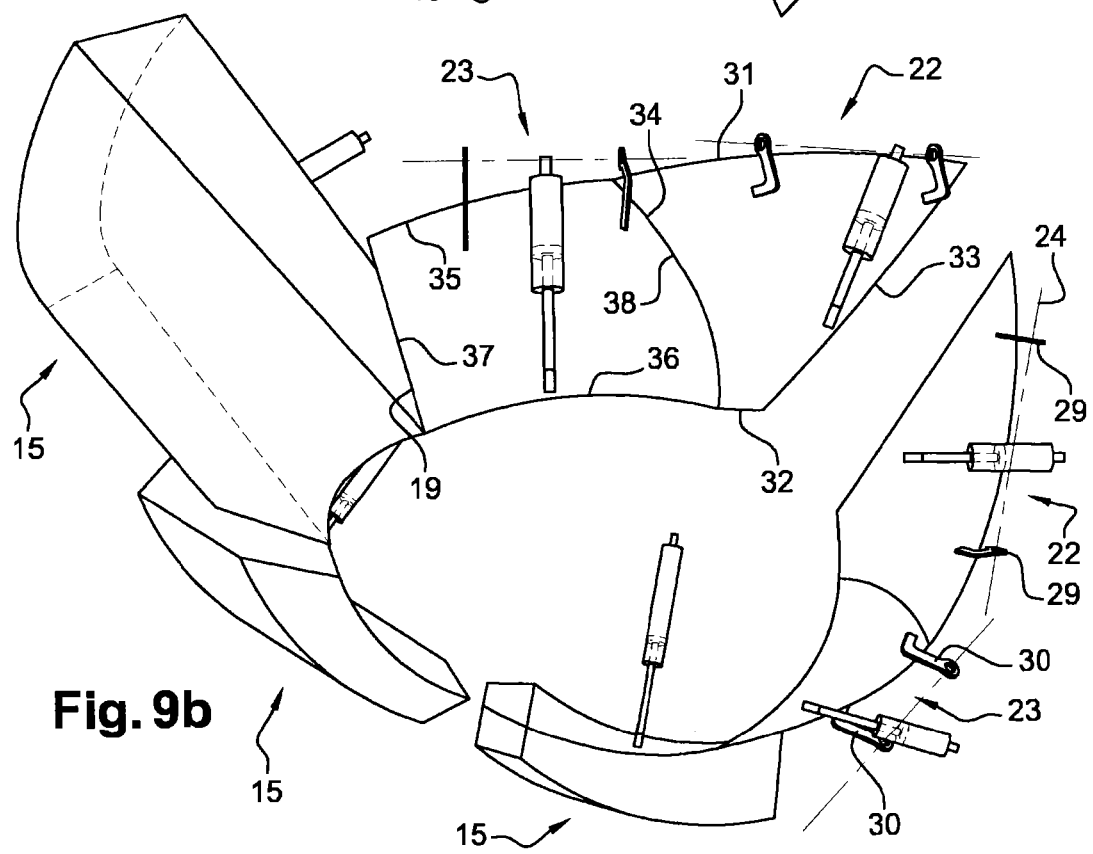

The mobile surfaces 22, 23 each present a left-leaning shape that is apparent particularly in FIGS. 9a and 9b, forming aerodynamic continuity with the external surface 10 of the secondary duct 8 when these doors are in their inoperative position. In this example, this shape is substantially that of a cone segment, which corresponds to the locally conical shape of the external surface 10 of the secondary air duct 8 at this location.

These mobile surfaces 22, 23 are made of rigid materials here, for example metallic or composite, and their thickness can be calculated by persons skilled in the art depending on the mechanical stress to be taken on when the mobile surfaces are in the thrust reversal position.

In this implementation example, provided here as a non-limiting illustration, the first mobile surface 22 is delimited by four edges.

A first edge, here called the external edge 31, is located near the hinge rotation axis 24. It is shaped in an arc, such that when the first mobile surface 22 is in the thrust reversal position, the external edge 31 comes into contact with the external surface 10 of the secondary duct 8 along its entire length.

A second edge, called the internal edge 32, is located opposite this first edge 31 and is substantially parallel to it. It is shaped in an arc, such that when the first mobile surface 22 is in the thrust reversal position, the internal edge 32 comes into contact with the internal surface 11 of the secondary duct 8 along its entire length.

A third edge, here called the mount edge 33, is located near the pylon 2 and connects the two preceding edges. It is shaped in an arc, such that when the first mobile surface 22 is in the thrust reversal position, the mount edge 32 comes into contact with the surface 21 of the pylon 2 in the secondary duct 8.

A fourth edge, called the continuance edge 34, connects the external edge 31 and the internal edge 32 onto the edge opposite the pylon 2.

In the same manner, the second mobile surface 23 is defined by four edges.

A first edge, here called the external edge 35, is located near the hinge rotation axis 25. It is shaped in an arc, such that when the first mobile surface 23 is in the thrust reversal position, the external edge 35 comes into contact with the external surface 10 of the secondary duct 8 along its entire edge.

A second edge, called the internal edge 36, is located opposite this first edge 31 and is substantially parallel to it. It is shaped in an arc, such that when the second mobile surface 23 is in the thrust reversal position, the internal edge 36 comes into contact with the external surface 11 of the secondary duct 8 along its entire length.

A third edge, here called the door edge 37, is located near the pivoting door 15 and connects the two preceding edges. It is shaped in an arc, such that when the first mobile surface 23 is in the thrust reversal position, the door edge 37 comes into contact with the lateral edge 19 of the pivoting door 15 in the secondary duct 8.

A fourth edge, called the continuance edge 38, connects the external edge 35 and the internal edge 36 onto the edge opposite the pivoting door 15.

In this example, the continuity edges 34, 38 of the two mobile surfaces 22, 23 are shaped such that when the mobile surfaces 22, 23 are in the thrust reversal position, these continuity edges 34, 38 come into contact with each other along their entire length.

Figure 8A:
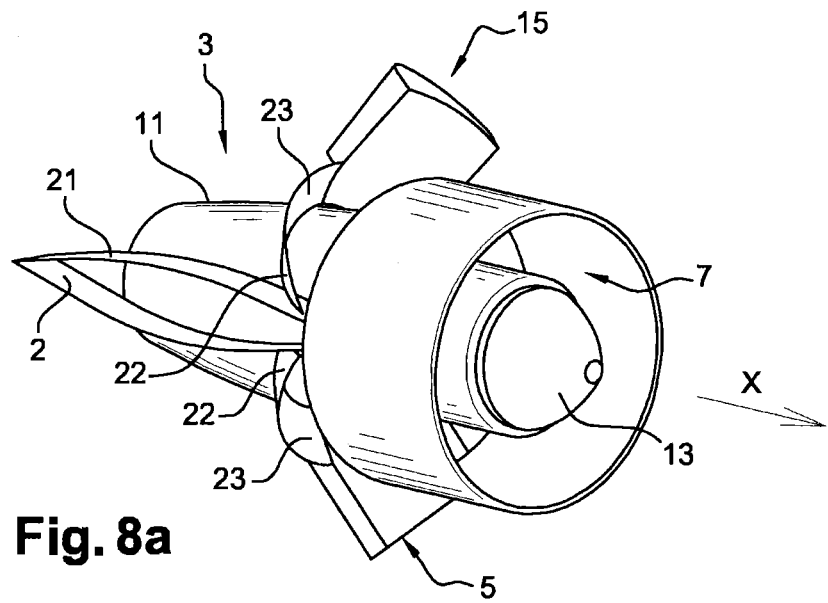
FIGS. 8a and 8b: Perspective views of a turbofan engine and thrust reversers, seen from the support pylon side
Figure 8B:
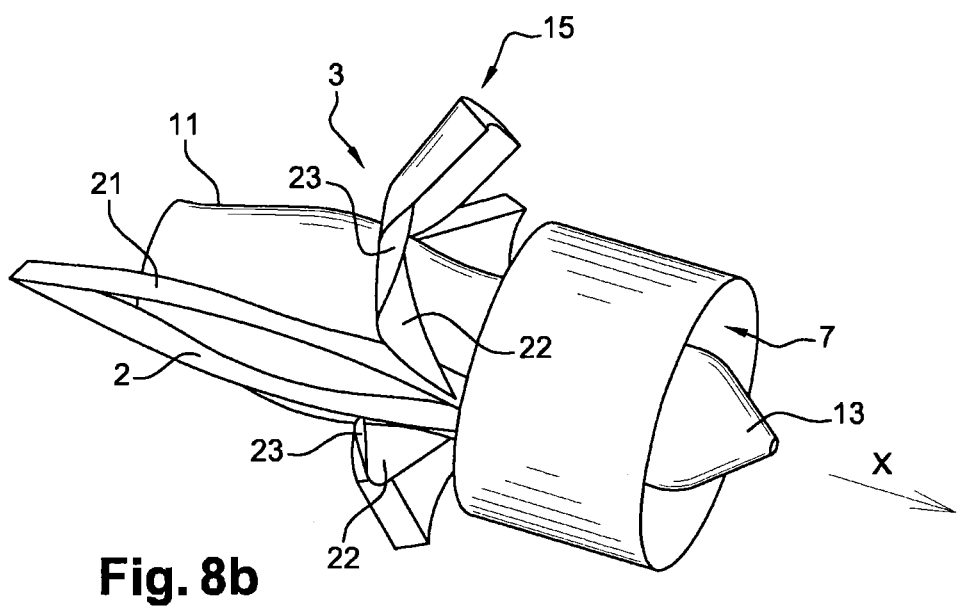

Aerodynamic continuity thus assured, when the deflectors and the pivoting doors are in the thrust reversal position, is illustrated in FIGS. 8a and 8b, according to two angles in different views.

Manner of Functioning

The guiding process for a thrust reverser as described above in a fully non-limiting example, normally involves the simultaneous opening of the pivoting doors 15 and commanding the mobile surfaces 22, 23 toward the thrust reversal position. In this position, the secondary duct 8 is totally obstructed and air is channeled by mobile surfaces 22, 23 toward the open pivoting doors 15 and toward the openings 20 thus created in the substance of the nacelle 1.

Advantages of the Invention

The thrust reverser device as described makes it possible to add an installation onto the nacelles for which only a part of the surface is adapted to accommodate standard thrust reversers.

The device described is mechanically simple and may be incorporated into the secondary duct using a minimum of space.

Variants of the Invention

The scope of this invention is not limited to the details of forms of embodiments reviewed above as examples; on the contrary, it extends to additional modifications that may be implemented by persons skilled in the art.

As has been said, it is clear that the pivoting doors 15 may be replaced be grilles of a known type, without modifying the principle of the invention. Here again, the deflecting surfaces are arrayed in the secondary duct 8 to angularly deflect air toward the sector of the nacelle where this air can be exhausted through openings 20 in the substance of the said nacelle.

The deflector as described comprises two mobile surfaces 22, 23. Variants using a different number of mobile surfaces can naturally be considered, depending on the shaping of the air duct.

Mention was made in the above description of rigid mobile surfaces. A possible variant consists in using a flexible mobile surface supported by hinged stiffeners. This type of flexible surface can be done in composite material or in textile material capable of resisting the air temperature circulating in the secondary duct.

The invention claimed is:

1. A jet propulsion unit of an aircraft, comprising:
   a turbofan engine faired by a nacelle, and held in suspension by at least one pylon, the turbofan engine including a fan;
   a duct that channels air accelerated by the fan, the duct being bounded by an internal surface of the duct and an inner surface of the nacelle; and
   a thrust reverser device including a first part and a second part, wherein
   the jet propulsion unit has a first circumferential sector and a second circumferential sector distinct from the first circumferential sector, wherein the first circumferential sector and the second circumferential sector span the entire turbofan engine,
   the first part is entirely within the first circumferential sector and includes doors that channel the air in the duct towards an exterior of the jet propulsion unit via openings, and
   the second part is entirely within the second circumferential sector and includes mobile elements that channel the air in the duct toward the doors.

2. The jet propulsion unit according to claim 1, wherein the mobile elements comprise at least one internal deflector suited to constitute aerodynamic continuity of the inner surface of the nacelle when the deflector is in a propulsion position, and to channel the air toward the doors when the deflector is in a thrust reversal mode.

3. The jet propulsion unit according to claim 2, wherein the at least one internal deflector comprises a first mobile surface, rotatably hinged, with a shape of the first mobile surface being continuous with the inner surface of the nacelle, when the first mobile surface is in an angular rest position and two edges of the first mobile surface are in substantial contact with the inner surface of the nacelle and with the internal surface of the duct respectively, when the first mobile surface is in an angular thrust reversal position.

4. The jet propulsion unit according to claim 3, wherein the first mobile surface is located near the pylon which traverses the duct and supports the turbofan engine, the first mobile surface including a mount edge coming into substantial contact with a surface of the pylon when the first mobile surface is in the angular thrust reversal position.

5. The jet propulsion unit according to claim 2, wherein the mobile elements include two internal deflectors, arrayed on each side of the pylon.

6. The jet propulsion unit according to claim 2, wherein the at least one internal deflector is formed by at least two mobile surfaces, substantially in cylindrical or conical sectors, with each one of the at least two mobile surfaces being rotatably hinged on an axis separate from a longitudinal axis X of the turbofan engine, between an inoperative position in which the mobile surfaces are continuous with the inner surface of the nacelle, and a thrust reversal position, in which the mobile surfaces locally interrupt the air in the duct, and channel the air toward the doors.

7. The jet propulsion unit according to claim 6, wherein the mobile surfaces comprise continuous edges facing and complementary to each other, configured to come into contact with each other when the said mobile surfaces are in the thrust reversal position.

8. The jet propulsion unit according to claim 3, wherein the at least one mobile surface comprises an edge that comes into contact with an edge of one of the doors toward the inner surface of the nacelle, when the mobile surface and the one door are in the angular thrust reversal position.

9. The jet propulsion unit according to claim 2, wherein the at least one internal deflector is formed from mobile surfaces including a first mobile surface being set in an area of the pylon and a second mobile surface set in the an area of the doors toward the exterior of the jet propulsion unit, with the a hinge axis of the first mobile surface oriented substantially at an angle of between 40 and 50° with a longitudinal axis X of the turbofan engine, and the hinge axis of the second mobile surface oriented substantially at an angle of between 60 and 80° with the longitudinal axis X of the turbofan engine.

\* \* \* \* \*